Feb. 28, 1928.
F. P. HARTUNG
1,661,069
METHOD AND APPARATUS FOR MAKING STRIP RUBBER
Filed Nov. 14, 1925  2 Sheets-Sheet 1
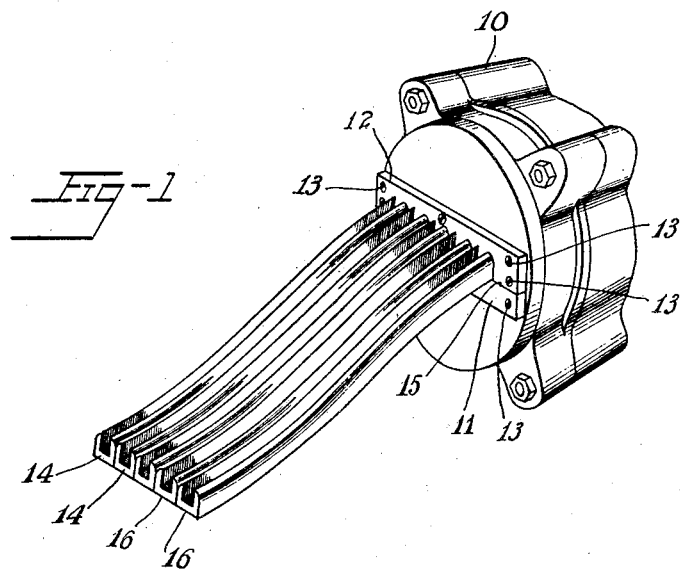
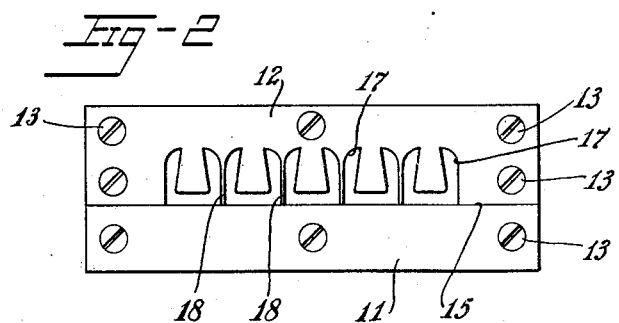
INVENTOR
Florenz P. Hartung
By Pierson, Eakin & Avery
Attys- Feb. 28, 1928.     1,661,069
F. P. HARTUNG
METHOD AND APPARATUS FOR MAKING STRIP RUBBER
Filed Nov. 14, 1925     2 Sheets-Sheet 2
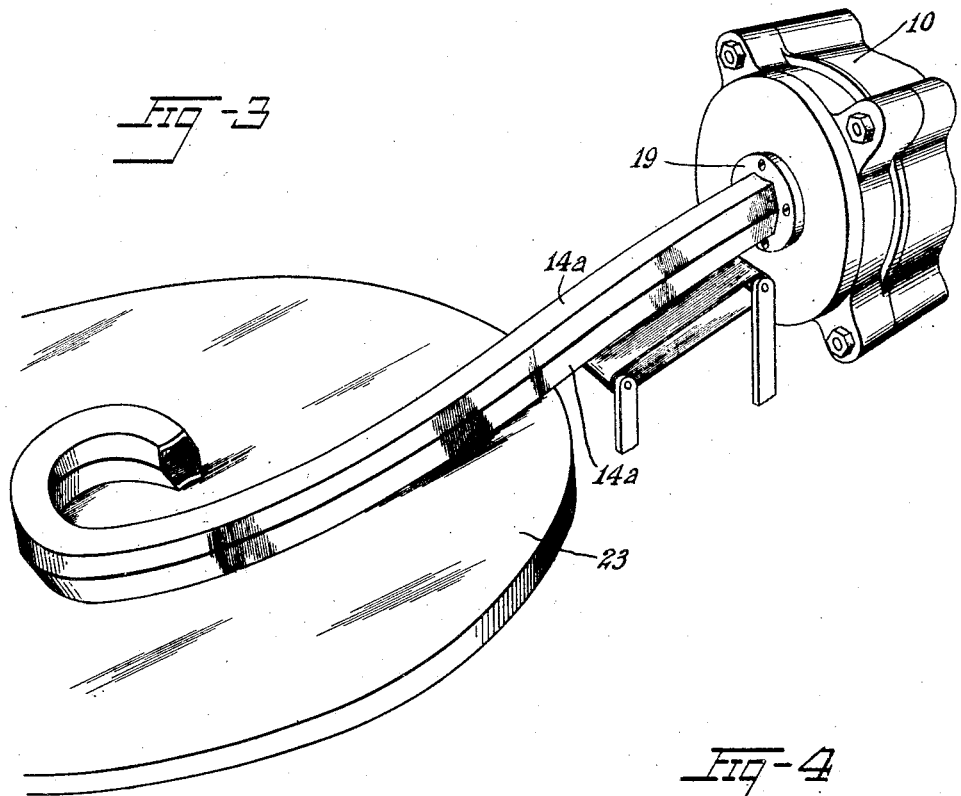
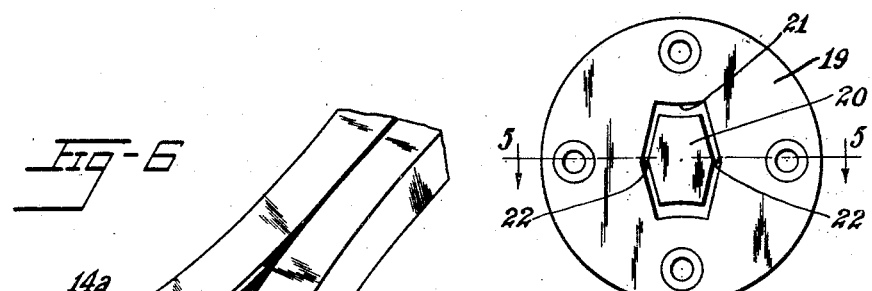
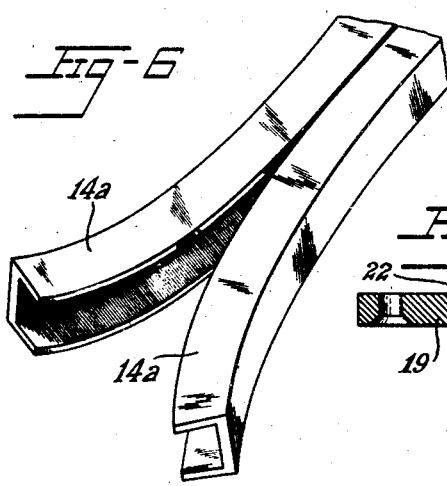
Inventor
Florenz P. Hartung
By Pierson, Eakin & Avery
Attys Patented Feb. 28, 1928.

1,661,069

UNITED STATES PATENT OFFICE.

FLORENZ P. HARTUNG, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING STRIP RUBBER.

Application filed November 14, 1925. Serial No. 68,952.

This invention relates to the manufacture of rubber strips and especially strips of special cross-sectional form, such as the channel strips commonly used as cushion guides for the window glass of automobiles.

My chief objects are rapidity and economy of manufacture. More specific objects are to form a plurality of strips by means of an extruding machine in such manner that they may be conveniently and economically handled in subsequent operations upon them, such as the vulcanizing operation. A further object is to avoid undesirable distortion of the strips prior to and during vulcanization and thereby to obtain a high quality product.

I attain these objects by employing an extruding machine adapted to extrude a plurality of strips in such proximity to each other as to cause them to come progressively into contact as the rubber swells upon emerging from the die or by reason of their varying individually from a true course, or by extruding a plurality of the strips in the form of a unitary structure in which the indiviual strips are joined together by very light webs of rubber so that they subsequently may be very readily broken apart or otherwise separated.

I prefer the former procedure, as it is well adapted for the formation of a large number of strips simultaneously and I find that the strips may be caused to adhere together sufficiently to support each other against distortion during the vulcanizing operation and yet may be readily separated after they are vulcanized.

Of the accompanying drawings:

Fig. 1 is a perspective view of the delivery end of an extruding machine embodying and adapted to carry out my invention in its preferred form, with the work issuing therefrom.

Fig. 2 is an elevation of the extruding machine die.

Fig. 3 is a perspective view showing a modification.

Fig. 4 is an elevation of the modified die.

Fig. 5 is a section on line 5—5 of Fig. 4.

Fig. 6 is a perspective view of the product obtained by the use of the modification.

Referring to the drawings, the preferred form of my invention is shown in Figs. 1 and 2, wherein an extruding machine 10 is provided with a two-part die comprising a lower plate 11 and an upper plate 12 secured to the head of the machine by screws 13, 13.

The plates here shown are adapted to form a plurality of rubber strips 14, 14 of channel form, the lower plate 11 having a straight upper edge 15 adapted to shape the outer base faces 16, 16 of the several channel strips and the upper plate 12 being formed with a series of spaced-apart notches 17, 17 adapted to form the rest of the cross-sectional outlines of the several strips, the notches being separated by thin webs or tongues 18, 18 so that the channel strips will emerge from the die very close together and will promptly contact and adhere to each other as the rubber swells upon emerging from the die. Their coming into contact also may be contributed to to some extent by the squirming motion usually present in the extruding of rubber strips, and such squirming is limited and twisting or kinking of the strips is prevented by the joining of the several strips in a single structure.

When the strips are of the channel section here shown and emerge in the relative positions shown the contact and adhesion of adjacent strips is such that their adjacent legs are supported by the adhesion of their outer faces to each other, and the several strips constitute a unitary structure which may be freely handled without collapse or undue distortion of the individual strips.

As the combined structure emerges from the extruding machine it is cut in suitable lengths and vulcanized, preferably by the usual method of curing in open steam, and after the vulcanization the several strips are separated from each other, which readily may be done by simply pulling them apart, the adhesion being light, apparently because of the comparatively light pressure with which the strips contact each other in emerging from the machine and also no doubt because of the surfacing effect of the die upon the individual strips. I do not wholly limit my claims, however, to extruding the several strips entirely disconnected from each other as they pass through the die, since the plates 11, 12 may be permitted to spread apart slightly and thereby permit the formation of fins connecting the adjacent strips at the ends of the tongues 18, without sacrificing all of the advantages of my invention, and in some instances such practice may be desirable.

In the modification shown in Figs. 3 to 6 the extruding machine 10 is provided with a die 19 and a mandrel 20 (Figs. 4 and 5) defining an annular aperture 21 of polygonal form adapted for the extrusion of two channel strips 14ᵃ, 14ᵃ with their backs or bases away from each other and the legs of one lightly joined to those of the other along the middle of the composite strip, the die 19 being formed with small projections 22, 22 extending into the aperture at the dividing line between the two channel strips, to weaken and almost sever the stock of the two strips so that the latter subsequently may be readily torn apart.

The form of the aperture 21 is preferably such that the strips emerge from the die with their legs diverging from each other, as shown, to assure that the comparatively thin walls represented by the legs will not collapse toward and contact each other, and the cross-sectional form of the combined strip may be later modified, as by tightly coiling the combined strip upon a table 23, for the vulcanizing operation, so as to cause the legs of each strip to stand in parallel relation to each other, as shown in Fig. 6, in the vulcanized product.

The strip, thus coiled upon the table 23, is preferably vulcanized in open steam, after which the individual channel strips are separated from each other as shown in Fig. 6, which may be done by simply pulling them apart.

My invention affords the several advantages set out in the above statement of objects and may be variously modified without complete sacrifice thereof, in view of which I do not wholly limit my claims to the exact procedure or the specific construction herein shown and described.

I claim:

1. The method of making rubber strips which comprises simultaneously extruding a plurality of strips in such association that they adhere lightly to each other, conveying the strips and further manipulating them as a unit in factory procedure while they remain in such association, and subsequently separating said strips.

2. A method as defined in claim 1 in which the strips are of channel section and are extruded side by side with a leg of one strip presented flatwise to that of another strip.

3. The method of making rubber strips which comprises simultaneously extruding a plurality of strips in such association that they adhere lightly to each other, vulcanizing the strips, and subsequently separating said strips.

4. The method of making rubber strips which comprises simultaneously extruding a plurality of strips in such association that their surfaces come progressively into contact and adhere to each other after passing from the extruding means and adhere to each other, conveying the strips and further manipulating them as a unit in factory procedure while they remain adhered together, and subsequently breaking said strips apart.

5. A method as defined in claim 4 in which the strips are of channel section and are extruded side by side with a leg of one strip presented flatwise to that of another strip.

6. The method of making rubber strips which comprises simultaneously extruding a plurality of strips in such association that their surfaces come progressively into contact after passing from the extruding means and adhere to each other, vulcanizing the strips, and subsequently breaking said strips apart.

7. An extruding machine die formed with a plurality of U-shaped delivery channels substantially separated from each other by thin projections from the die structure.

In witness whereof I have hereunto set my hand this 9th day of November, 1925

FLORENZ P. HARTUNG.